United States Patent
Amira et al.

(10) Patent No.: US 10,724,561 B2
(45) Date of Patent: Jul. 28, 2020

(54) JOINED INCOMPATIBLE METALLIC PARTS AND METHOD OF JOINING

(71) Applicant: NATIONAL RESEARCH COUNCIL OF CANADA, Ottawa (CA)

(72) Inventors: Sofiene Amira, Saguenay (CA); Patrick Gougeon, Saguenay (CA); Jean-Gabriel Legoux, Repentigny (CA); Francois Nadeau, Saguenay (CA)

(73) Assignee: National Research Council of Canada, Ottawa, Ontario (CA)

(*) Notice: Subject to any disclaimer, the term of this patent is extended or adjusted under 35 U.S.C. 154(b) by 0 days.

(21) Appl. No.: 15/506,141

(22) PCT Filed: Oct. 28, 2016

(86) PCT No.: PCT/IB2016/056539
§ 371 (c)(1),
(2) Date: Feb. 23, 2017

(87) PCT Pub. No.: WO2017/072735
PCT Pub. Date: May 4, 2017

(65) Prior Publication Data
US 2018/0221985 A1 Aug. 9, 2018

Related U.S. Application Data

(60) Provisional application No. 62/248,574, filed on Oct. 30, 2015.

(51) Int. Cl.
*F16B 5/08* (2006.01)
*B23K 20/12* (2006.01)
(Continued)

(52) U.S. Cl.
CPC ............ *F16B 5/08* (2013.01); *B23K 20/1225* (2013.01); *B23K 20/1265* (2013.01);
(Continued)

(58) Field of Classification Search
CPC .................................................. B23K 20/1225; B23K 20/1265; B23K 20/16; B23K 20/2275; B23K 20/2333;
(Continued)

(56) References Cited

U.S. PATENT DOCUMENTS 7,686,205 B2 * 3/2010 Okamoto ........... B23K 20/2333
228/122.1
7,732,033 B2 * 6/2010 Van Aken .......... B23K 20/1225
228/112.1
(Continued)

FOREIGN PATENT DOCUMENTS

JP  10071479 A * 3/1998 ......... B23K 20/1265
WO  2006113011  10/2006

OTHER PUBLICATIONS

Aonuma M., et al., Dissimilar metal joining of 2024 & 7075 aluminium alloys to titanium alloys by friction stir welding, Mater. Trans. vol. 52, No. 5 (2011) pp. 934-952.
(Continued)

*Primary Examiner* — Josh Skroupa
(74) *Attorney, Agent, or Firm* — Jason E. J. Davis; National Research Council of Canada (57) ABSTRACT

A technique for joining parts of incompatible metals involves cold spraying a 150-900 micron thick layer of a metal compatible with the second part onto the first part, and friction stir joining the parts by lap welding while keeping a tool of the FSJ tool at least 300 microns away from the first part (less layer) throughout the joining, to avoid damaging
(Continued)

the cold spray to first part interface, and formation of intermetallics. Fatigue resistance was tested, with and without a sealant.

14 Claims, 4 Drawing Sheets

(51) Int. Cl.
| | |
|---|---|
| *B23K 20/16* | (2006.01) |
| *B23K 20/24* | (2006.01) |
| *B23K 20/233* | (2006.01) |
| *B23K 20/227* | (2006.01) |
| *B23K 101/18* | (2006.01) |
| *B23K 103/20* | (2006.01) |
| *B23K 103/12* | (2006.01) |
| *B23K 103/10* | (2006.01) |
| *B23K 103/08* | (2006.01) |
| *B23K 103/18* | (2006.01) |
| *B23K 103/14* | (2006.01) |

(52) U.S. Cl.
CPC .......... *B23K 20/16* (2013.01); *B23K 20/2275* (2013.01); *B23K 20/2333* (2013.01); *B23K 20/24* (2013.01); *B23K 2101/18* (2018.08); *B23K 2103/10* (2018.08); *B23K 2103/12* (2018.08); *B23K 2103/14* (2018.08); *B23K 2103/15* (2018.08); *B23K 2103/18* (2018.08); *B23K 2103/20* (2018.08)

(58) Field of Classification Search
CPC .................................................. B23K 20/24; B23K 2101/18; B23K 2103/10; B23K 2103/12; B23K 2103/14; B23K 2103/15; B23K 2103/18; B23K 2103/20; F16B 5/08; Y10T 403/477; Y10T 403/478; Y10T 403/49
USPC ......................................... 403/270, 271, 272
See application file for complete search history.

(56) References Cited

U.S. PATENT DOCUMENTS

| | | | | |
|---|---|---|---|---|
| 7,951,465 | B2 * | 5/2011 | Urushihara | ............ B23K 11/20 |
| | | | | 428/572 |
| 9,289,842 | B2 * | 3/2016 | Chen | .................... B23K 9/0008 |
| 10,220,885 | B2 * | 3/2019 | Yamada | .................. B23K 11/34 |
| 2005/0218121 | A1 * | 10/2005 | Hayashi | ................. B23K 11/20 |
| | | | | 219/118 |
| 2006/0231595 | A1 * | 10/2006 | Quinn | ................. B23K 20/1235 |
| | | | | 228/112.1 |
| 2010/0089977 | A1 | 4/2010 | Chen et al. | |
| 2011/0309131 | A1 | 12/2011 | Hovanski et al. | |
| 2014/0248510 | A1 | 9/2014 | Sayama et al. | |

OTHER PUBLICATIONS

Bozzi S., et al., Intermetallic compounds in Al 6016-IF-steel friction stir spot welds, Mater. Sci. Eng., vol. 527, Jun. 2010, pp. 4505-4509.
Chen Y.C., et al., Friction stir lap joining aluminum & magnesium alloys, Scripta Materialia, vol. 58, Issue 6, Mar. 2008, pp. 433-436.
Chen Y.C., et al., Friction stir lap welding of magnesium alloy & zinc-coated steel, Mater. Trans., vol. 50, No. 11 (2009), pp. 2598-2603.
Chen Y.C., et al., Microstructural characterization & mechanical properties in friction stir welding of aluminum & titanium dissimilar alloys, Mat. & Des., vol. 30, Mar. 2009, pp. 469-474.
Jana S., et al., Friction stir lap welding of magnesium alloy to steel—A preliminary investigation, Metal. Mater. Trans. A, vol. 41A, Dec. 2010, pp. 3173-3182.
Justman, R., et al., Friction stir lap welding aluminum to steel using scribe technology, SD School of Mines & Technology, 2013.
Liu L., et al., A review of dissimilar welding techniques for magnesium alloys to aluminum alloys, Materials 2014, 7(5), pp. 3735-3757.
Mubiayi M.P., et al., Friction stir welding of dissimilar materials between aluminum alloys & copper—An overview, Proc. World Congress Eng., WCE 2013, vol. III.
Xue P., et al., Enhanced mechanical properties of friction stir welded dissimilar Al—Cu joint by intermetallic compounds, Mater. Sci. Eng., vol. 527, Aug. 2010, pp. 5723-5727.
Aonuma M., et al., Weldability of pure titanium & AZ31 magnesium alloy by friction stir welding, Journ. Jap. Inst. of Light, 2007, vol. 57, No. 3, pp. 112-118.
Haghshenas "Friction Stir Weld Assisted Diffusion Bonding of 5754 Aluminum Alloy to Coated High Strength Steels" (Materials and Design 55 (2014)) 442-449.
A new way to join aluminum and steel—SAE International—12318—Jul. 26, 2013.
Champagne, V.K., III, "Joining of Dissimilar Materials by the Cold Spray Process" Proc. ITSC 2015 May 11-14, 2015, pp. 559-565.

* cited by examiner

FIG. 7 Conventional FSW

JOINED INCOMPATIBLE METALLIC PARTS AND METHOD OF JOINING

CROSS-REFERENCE TO RELATED APPLICATIONS

This application is a national phase entry of International Patent Application PCT/IB2016/056539 filed Oct. 28, 2016, which claims the benefit of U.S. Provisional Patent Application Ser. No. 62/248,574 filed Oct. 30, 2015.

FIELD OF THE INVENTION

The present invention relates in general to the joining of first and second incompatible metallic parts, and in particular to cold spraying a coating of a third metal compatible with the second part onto the first part, and friction stir joining the two parts together without letting a tool tip of the FSW tool getting closer than a given distance from first part less coating.

BACKGROUND OF THE INVENTION

Cold plastic deformation of metals is a wonderful thing. It allows for processing of metal below its melting point, avoiding a host of problems with the formation of intermetallics, and oxides, and has been developed in different processes including cold spray, and friction stir joining (FSJ), including friction stir welding (FSW), and friction stir diffusion bonding (FSDB). The useful deployment of cold plastic deformation to join dissimilar metals needs to be improved, and a technique for FSJ incompatible metallic parts, especially if the metals of the two parts are prone to forming intermetallics, is needed because such intermetallics generally reduce a fatigue life of the join.

Unfortunately intermetallics are produced by joining most metals. Dissimilar material combinations shown or believed to form intermetallic compounds during FSW include: Al base alloys FSW to Fe base alloys (hereinafter two metals separated by a hyphen denote an alloy of the first FSW bonded to an alloy of the second, thus the first example is Al—Fe), Al—Mg, Al—Cu, Al—Ti, Mg—Fe, Mg—Cu, and Mg—Ti.

Al—Fe: Friction stir welding in lap joint or spot configuration has been shown to form intermetallics (Bozzi S., 2010, Intermetallic compounds in Al 6016/IF-steel friction stir spot welds; Justman R., 2013, Friction stir lap welding aluminum to steel using scribe technology). According to Bozzi, $FeAl_3$, $Fe_7Al_5$ & $FeAl_2$ are generated during FSW.

Al—Mg: Friction stir welding in lap joint configuration has been shown to form intermetallics (Chen Y. C., 2007, Friction stir lap joining aluminum & magnesium alloys; Liu L, 2014, A review of dissimilar welding techniques for magnesium alloys to aluminum alloys). According to Chen, brittle $Mg_{17}Al_{12}$ & gamma phase $Mg_2Al_3$ intermetallics are mostly generated during the FSW process.

Al—Cu: Friction stir welding in butt joint configuration has been shown to form intermetallics (Xue P., 2010, Enhanced mechanical properties of friction stir welded dissimilar Al—Cu joint by intermetallic compounds; Mubiayi M. P., 2013, Friction stir welding of dissimilar materials between aluminum alloys & copper—An overview). According to Xue, some intermetallics are generated during the FSW process such as $Al_2Cu$ & $Al_4Cu_9$. However, according to Mubiayi's paper, most of the structure of the weld nugget zone is largely a plastic diffusion combination of copper & aluminum.

Al—Ti: Friction stir welding in lap joint configuration has been shown to form intermetallics (Chen Y. C., 2009, Microstructural characterization & mechanical properties in friction stir welding of aluminum & titanium dissimilar alloys; Aonuma M., 2011, Dissimilar metal joining of 2024 & 7075 aluminium alloys to titanium alloys by friction stir welding). According to both papers, intermetallics ($TiAl_3$) are generated during FSW.

Mg—Fe: Friction stir welding in lap joint configuration has been shown to form intermetallics (Chen Y. C., 2009, Friction stir lap welding of magnesium alloy & zinc-coated steel; Jana S., 2010, Friction stir lap welding of magnesium alloy to steel: A preliminary investigation). According to Chen, intermetallics are generated during the FSW process ($Fe_4Al_{13}$). As most Mg alloys contain appreciable amounts of aluminum as a main alloying element, these intermetallics are considered problematic for Mg—Fe.

Mg—Cu: No literature work has been found on friction stir welding of magnesium to copper due to a lack of industrial relevance. However, the phase diagram indicates that intermetallic compounds should be produced between these materials, such as $CuMg_2$.

Mg—Ti: Friction stir welding in butt joint configuration has been shown to form intermetallics (Aonuma M., 2007, Weldability of pure titanium & AZ31 magnesium alloy by friction stir welding). According to Aonuma's paper, Al-rich titanium layer with under 2 μm in thickness was formed at joint interface. Although this paper did not use the word 'intermetallic' to describe the Al-rich titanium layer, it is obvious that $TiAl_3$ intermetallic compound was generated during the FSW process. Here again the aluminum is present due to the content of the Mg alloy.

Figure 1:
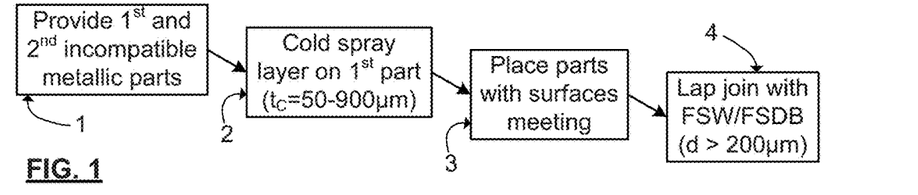
FIG. 1 is a flow chart schematically illustrating principal steps of a process in accordance with the present invention.

In a learned paper by Champagne III et al. entitled Joining of Dissimilar Materials by the Cold Spray Process (Proc. ITSC 2015 May 11-14, 2015, pp. 559-565), it is noted that cold spray and friction stir welding can be used for joining dissimilar metals. Specifically they report cold spraying Al onto a Mg plate, to a thickness of ~8.5 mm (Cold Spray Processing (CSP) p. 560), and FSW joining the MG plate to an Al plate with a butt weld (FIG. 1). "Without the cold spray layer this would not be achievable without the formation of an intermetallic layer at the dissimilar metal interface."

Unfortunately, this technique is applicable only to applications that can afford the time to deposit an 8.5 mm coating by cold spray (or at least a 5-25 mm as per FIG. 1).

Applicant has attempted to FSW join a steel part with a thinner cold spray Al coating of approximately 1 mm thickness, in butt configuration. The Al debonded during the FSW. This may be the reason why Champagne III el al. limited the coating to at least 5 mm. If a cold spray layer of at least 5 mm is required for FSW bonding, there may be no high-production-rate application for this joining, because the time required to develop a 5 mm cold spray layer is incompatible with low cost production.

A learned paper to Haghshenas et al. entitled Friction Stir Weld Assisted Diffusion Bonding of 5754 Aluminum Alloy to Coated High Strength Steels (Materials and Design (2013), doi: http://dx.doi.org/10.1016/j.matdes.2013.10.013) teaches FSDB of a high strength steel (specifically 22MnB5) that is coated with a 9 μm thick Al alloy (Al-12Si alloy). The FSDB process used brought the FSW tool "close to or nearly in contact (without penetrating) the lower steel plate". Haghshenas et al. note:

> However, the transformation of intermetallic compounds (i.e. Al5Fe2 to AlFe), is caused by change in the travel speed, and occurs in the "Al/St interface". It should be noted that the 22MnB5 alloy could only be joined in the as-received condition, where no austenitization heat treatment was conducted. Normally this alloy is utilized as hot-stamped martensitic steel, and the Al-12Si alloy coating on the sheet material undergoes some diffusion during heat treatment prior to hotstamping. When the 22MnB5 sheets were heat treated, the appearance of the coating had changed and it would not facilitate joining when using the friction stir welding parameters studied here. Modification of this Al-12Si coating after heat treatment by light abrasion or chemical pickling with HCl solution also failed to promote adhesion during friction stir welding.

An Al alloy coating, 9 μm thick, was shown by Haghshenas et al. to not shield an interface from the production of intermetallics when the pin comes close to the Al/St interface, and no value for joining can be attributed to the Al-12Si coating, however it was produced.

One of the requirements for low cost FSW joining of dissimilar metallic parts is that the FSW tool does not enter the part having a higher resistance to plasticization. In the case of joining steel and aluminum parts, if the FSW tool enters the steel, it can improve an initial bond strength of the join, but it severely decreases a longevity and expense of the FSW tools used, as suggested by Haghshenas et al. Furthermore, the mixing of steel with aluminum leads to poor fatigue resistance for the join. There is a long-felt want for a capability to reliably join two parts of incompatible metals (especially respective ones of: steel, aluminum, and magnesium) to produce fatigue resistant joins.

Thus joins of a variety of metals that would desirably accomplished by FSW are prevented because of the formation of brittle intermetallics leads to joints that have poor longevity.

SUMMARY OF THE INVENTION

Applicant has found a technique that improves the fatigue life of joints of metallic parts where the metals of the two parts are incompatible. By metallic part, a part is intended that has a composition, at least in the neighbourhood of the join (interface), with a metal fraction that is substantially uniformly distributed across the interface, such as in a metal matrix composite, cermet, or a part nominally composed of the metal. The metal/metal fraction refers to a pure metal, an alloy (solid state solution), or other relatively homogeneous mixture of metals, expressly including all Fe base alloys, all steels, all Al-base alloys, all Mg-base alloys, all Ti base alloys and all Cu-base alloys. 'Compatible metal' designates metals that do not form intermetallics that decrease a fatigue life of the join, when a temperature of the parts at the interface approaches a melting point of one of the metals, and incompatible metals form such intermetallics.

Unexpectedly, Applicant has found that by cold spraying a layer of a thickness (150-900 μm, more preferably 175-500 μm, most preferably 185-450 μm) which happens to be a more convenient, and cost effective, range of thicknesses for cold spraying than 8 μm or 5 mm, and using a lap FSJ configuration, delamination of the joint is avoided during the FSJ, and intermetallics are substantially suppressed, resulting in a higher fatigue resistance. Specifically the cold spray layer is applied on a $1^{st}$ part, which has a higher resistance to plasticization, so that friction stir welding is performed through the $2^{nd}$ part, which is more amenable to FSJ. The cold spray deposition is made of a third metal compatible with the $2^{nd}$ part, and preferably has an equally low resistance to plasticization as the $2^{nd}$ part, whereby it is subject to greater plastic deformation with lower inertia collisions and is thus easily cold sprayed. The third metal may be the same metal as that of the $2^{nd}$ part, or may be a different alloy of the same base metal, or may be a different, compatible metal.

By lap joining, herein is intended a process in which a shoulder of the friction stir tool meets only the $2^{nd}$ part (i.e. does not meet the $1^{st}$ part or cold sprayed layer) and (at least a substantial component of) a down force of the FSJ process, applied by the shoulder, pushes the $2^{nd}$ part toward the coated $1^{st}$ part. The substantial component may be provided by ensuring a mean angle between a rotary axis of the tool with respect to a normal of the first part is within −60° to 60', more preferably from −45° to 45', throughout the process. This contrasts the butt joining process shown FIG. 1. of Champagne III et al., and includes the FIG. 1 of Haghshenas et al. A consequence of the lap joining arrangement, as opposed to a butt joining arrangement, is that forces of the FSJ process do not tend to separate the parts. By keeping a minimum mean distance of at least 300 μm between the FSW tool tip and the metal of the $1^{st}$ part, formation of intermetallics of the metal of the $1^{st}$ part with that of the $2^{nd}$ part and the third metal can be avoided or minimized during the plasticization of the second metal, and at least some of the cold sprayed third metal.

Further contributing to the practicality of this invention, a very tight control over the distance between the tool tip and the metal of the first part is not required, and the efforts required by Haghshenas et al. ("the pin was maintained above the steel sheet and this position was ensured using a digital readout with 0.005 mm resolution") are not called for, as long as the nominal depth of the FSW tool tip is far enough away from the metal of the first part to avoid intermetallics, and near enough to the third metal to ensure joining.

A copy of the claims are incorporated herein by reference.

Accordingly, a process is provided for joining first and second metallic parts respectively having more of a first metal and second metal than any other element by weight, with the first metal being incompatible with the second metal, and the first metal having a lower propensity to cold plasticization than the second metal. The process involves: providing the first part with a surface for joining to a meeting surface of the second part; cold spraying onto the surface a 150-900 μm thick layer of a third metal that is compatible with the second metal; placing the coated surface against the meeting surface; and lap welding the two parts by friction stir joining while keeping a friction stir tool at least 300 μm away from the first metal throughout the joining.

The third metal may be the same as the second metal, and may specifically be Al or an Al-base alloy. The second part may contain more than 50 wt. % Al. The first part preferably has a higher hardness than the second part. The cold spray layer may be 150-900 μm thick, or more preferably 185-450 μm thick.

Throughout the joining, the friction stir tool is preferably kept a distance of less than 400 μm away from an interface between the cold sprayed layer and the second part.

The first part is preferably composed of one of: a steel, an alloy of titanium, an alloy of magnesium, a strengthened copper alloy, or a composite with most of the surface composed of one of: a steel, an alloy of titanium, an alloy of magnesium, a strengthened copper alloy.

Also accordingly a join is provided, the join comprising: a first metallic part comprising more of a first metal by weight than any other species; a second metallic part comprising more of a second metal by weight than any other species, the first and second metals being incompatible, and the first part having a lower propensity to cold plasticization than the second part; a 150-900 µm thick layer between the first and second parts, the layer being of a metal compatible with the second part, and having a morphology and interface with the first part, consistent with cold spray deposition of the layer; wherein a stir zone of dynamically recrystallized material runs from a side of the second part towards the first part, the stir zone having a concentric ring formation and being consistent with friction stir joining of the second part to the first part where a friction stir tool is kept at least 300 µm away from the first metal throughout the joining.

The stir zone and an interface between the layer and first part is preferably substantially devoid of intermetallics. The morphology preferably features an accretion of partially distinct, plastically deformed particles, away from the stir zone.

A sealant or adhesive may fill a space between the first and second parts away from the stir zone.

The second metal and compatible metal are preferably Al. The second metal and compatible metal may be Al or Mg, and the first metal, one of steel, Ti, Cu, or Mg.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Herein a technique is described for joining $1^{st}$ and $2^{nd}$ incompatible metallic parts where the (first) metal of the $1^{st}$ part has a lower propensity to cold plasticization than that of the (second) metal (that of the $2^{nd}$ part). The process involves cold spraying a 150-900 µm thick layer of a third metal that is compatible with the $2^{nd}$ part onto the $1^{st}$ part, and friction stir joining (FSJ) the parts together in a lap weld configuration, while keeping a tool tip of the FSW tool a minimum separation (herein 'd') from the lower propensity metal of at least 300 µm, to avoid damaging the cold spray interface with a plastic flow during the FSJ, and the formation of intermetallics.

FIG. 1 is a flow chart schematically illustrating principal steps of a process in accordance with the present invention. The process involves, at step 1, where parts are provided for the joining. At least two parts are provided, including one $1^{st}$ part, and one $2^{nd}$ part. The $1^{st}$ and $2^{nd}$ parts are incompatible. The first metal has a lower propensity to cold plasticization than the second metal so that the second part is more amenable to FSJ. The parts are furnished with respective surfaces in a condition allowing for an interface to be defined between at least two surfaces of the respective parts. While this may require surface geometries that mate, it may also be provide by providing one of the surfaces with sufficient pliability to conform during the FSJ. The interface having an intended set of one or more points on the interface for spot welding, and/or one or more curved or linear paths for stitch welding or continuous path welding.

In step 2, a layer of a third metal is applied to the $1^{st}$ part by cold spray. The third metal is compatible with the second part and so compatible with the second metal. The cold sprayed layer is 150-900 µm thick, more preferably 175-500 µm thick, and most preferably 185-450 µm thick, and is dense, substantially crack free, and of low porosity, within the limits of cold-spray. The cold spray layer has a morphology consisting of plastically deformed particles accreted on the surface.

Step 3 involves placing the $1^{st}$ part against the $2^{nd}$ part with the coating at the interface, for example on a tooling or in a jaw of a FSJ machine, and, as far as necessary, retaining them in place. Finally (step 4) a lap joining process is performed, while keeping the tool a mean distance of at least 300 µm away from the first metal. Preferably the tool is not more than 250 µm away from the cold spray layer. It may be preferred, when the cold spray layer is thick enough, to at least partially enter the cold sprayed layer, to ensure a better adhesion between the cold spray layer and the $2^{nd}$ part.

Figures 2A, 2B, 2C:
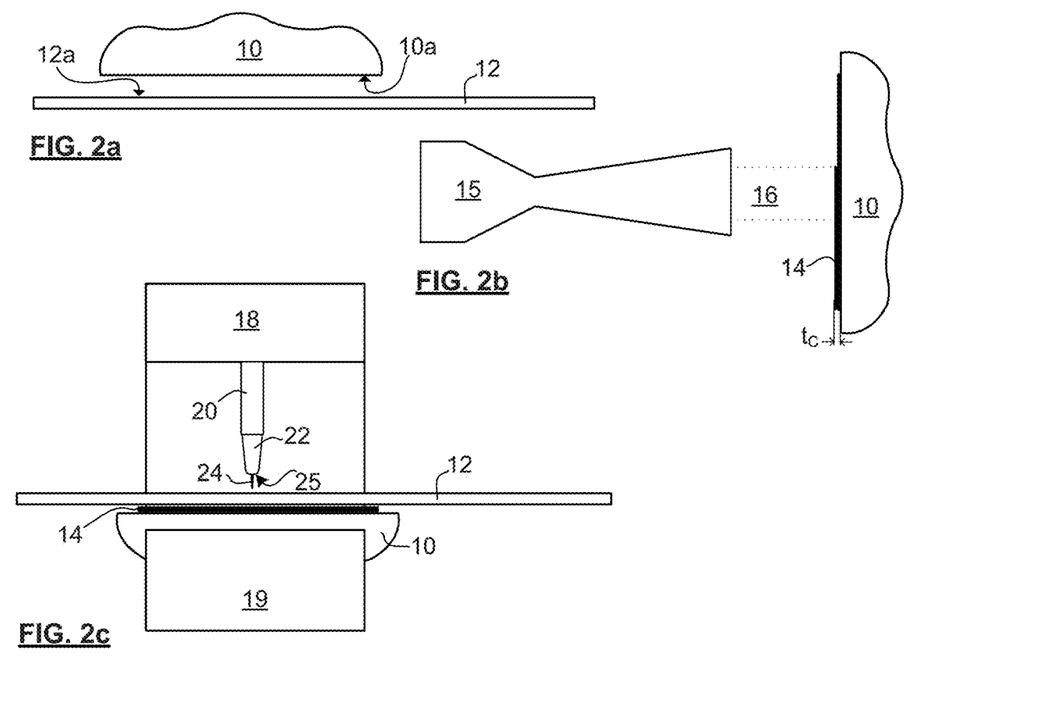
FIG. 2a-c are schematic illustrations of an apparatus at first, second and third steps of the process of FIG. 1, respectively.

FIG. 2a is a schematic illustration of a cross-section of a $1^{st}$ part 10, and a $2^{nd}$ part 12, in accordance with an embodiment of the present invention. The shape of the $1^{st}$ part 10 is intended to convey a rib or stiffening element intended to support the $2^{nd}$ part 12, which is a relatively thin sheet, a full extent of which sheet cross-section is not shown for convenience. Such support elements are common in aircraft construction, automotive applications, as well as in larger ground vehicles, such as busses, and may be used in building construction, appliances and consumer goods, as well. The overlap of meeting surfaces 10a,12a of the parts may be partial, or complete (as shown).

The present invention is in no way intended to be limited by the geometries of parts 10,12, as long as the parts have meeting faces 10a,12a and can be supported for lap joining. While a local thickness of the part 12 in the area(s) of the FSJ process (which may be points, short lines/curves, or long lines/curves respectively associated with spot welds, stitch welds, and/or seams) in order for the FSJ process to be efficient, parts of a wide variety of shapes can be formed or machined to provide access to the area(s). Thus if the part 12 were steel, titanium, a strengthened copper alloy, or magnesium, and the part 10 were aluminum, the coating would be applied to the part 12, and a slot, or hole would be bored partially through 10 to provide access to the area(s) for the weld. One of the parts 10,12 may be a flange, or protrusion of a larger part or frame assembly. For the remainder of this example it will be assumed that the part 12 is formed of a material that has lower propensity for plasticization.

The parts 10,12 have respective meeting surfaces 10$a$,12$a$ that define an interface along which joining is to be performed. The meeting surfaces 10$a$,12$a$ are shown having a same initial curvature (specifically no curvature), but it will be appreciated that, subject to limitations of deformation, the meeting surfaces 10$a$,12$a$ may be made to adopt a matching shape only during the joining step.

The $1^{st}$ part may have a hardness and brittleness in a range over which the third metal is capable of being cold sprayed onto the $1^{st}$ part, and thus this technique is amenable to the joining of hardened steels to soft metal parts like Al alloys, and generally metals having different toughness, strengths, stiffness properties, and resistances to environmental degradation can be joined for the better engineering of the assembled structure.

FIG. 2$b$ schematically illustrates a cold spray system 15 projecting a high velocity jet of solid powder 16 of the third metal onto the meeting surface 10$a$, to build up a layer 14. The layer is built up to a (mean) thickness defined as $t_c$, and is preferably between 150 and 900 µm, in accordance with the present invention, more preferably between 175 and 500 µm, and most preferably from 185 to 450 µm. With some material selections it is found that about 185 µm coatings are minimal effective thickness. Cold spray is a well-known technique for coating and is suitable for mass production.

FIG. 2$c$ schematically illustrates the positioning of the parts 10,12 with the cold sprayed layer 14 deposited on the part 10, in a support 19, with a friction stir welding machine 18 poised to join the parts. It will be appreciated that the support 19 may be a jaw of a C-frame of the FSW machine 18, or may be a part of a uni- or multi-dimensional motion stage for providing a relative movement of the supported parts 10,12 throughout joining. Additionally or alternatively, the FSW machine 18 may be an end effector of a robot or kinematic machine.

The FSW machine 18 drives a rotary spindle 20 with a tool 22 having a tip 24 and a shoulder 25 that both cooperate for FSJ, in a manner well known in the art. It will be appreciated that the difference between FSW and FSDB is determined chiefly by a plunge depth of the tool tip 24 (tool length) relative to the local thickness of $2^{nd}$ part 12, and not by any operating mode or other feature of the FSW machine.

Figure 3A:
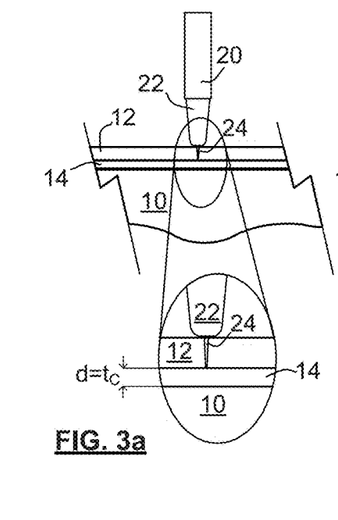
FIG. 3a is a schematic partial view of a FSJ position where a tool length matches a thickness of a second part.
Figure 3B:
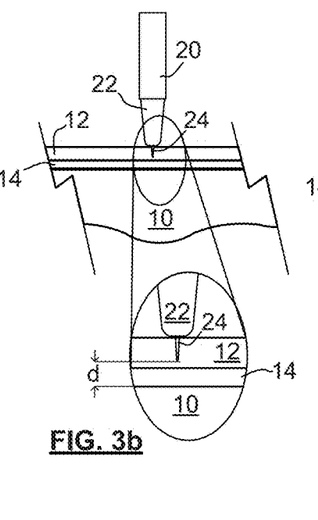
FIG. 3b is a schematic partial view of FSDB joining where a tool length is shorter than a thickness of the second part.
Figure 3C:
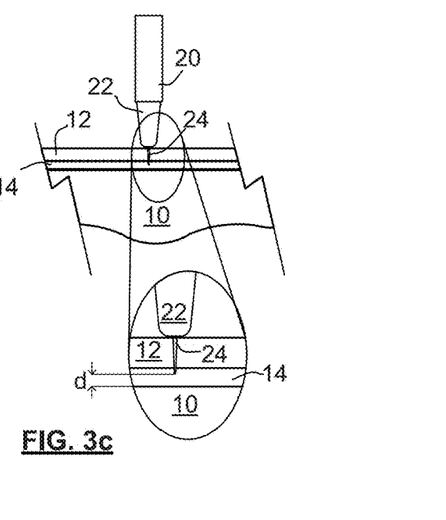
FIG. 3c is a schematic partial view of FSW joining where a tool length is longer than a thickness of a second part.

FIGS. 3$a,b,c$ are enlarged views of processes for FSJ joining the parts 10,12, with the FSW machine 18 and support 19 not shown for greater clarity. As can be seen more clearly in the enlarged views, a length of the tip 24 relative to the thickness of part 12 determines whether the joining is formally by FSDB (as in FIG. 3$b$) or by FSW (as in FIG. 3$c$).

In FIG. 3$a$, a FSJ process involves a pin that is of a length that extends just about a thickness of $2^{nd}$ part 12 (less a compression of part 12 as a result of the down force), whereby the separation d between the end of the tool tip 24 and the $1^{st}$ part 10 (less coating 14) is the thickness of coating 14 ($t_c$). In accordance with the present invention, the separation d is controlled throughout the FSW process to ensure that plasticized material flow around the tool tip 24 does not damage the interface between the first metal and the coating 14 in any significant or substantial quantity, especially to any degree that would reduce fatigue resistance.

FIG. 3$b$ schematically illustrates a FSDB joining technique where the tool tip 24 is near but does not enter the coating 14. The entire extent of the coating 14 and some of the part 12 therefore serve to distance the first metal from the tool tip 24. The FSDB joining technique preferably entrains some of the compatible metal of coating 14 in the plasticization current, and the tool tip 24 is therefore within a suitable distance that is principally decided by the material, but may also be affected by traverse speed, down force and rotation rate. For a $2^{nd}$ part and coating 14 of Al or its alloys, a distance of less than 200 µm from the $2^{nd}$ part 12 to coating 14 interface would be sufficient for FSDB joining.

FIG. 3$c$ schematically illustrates a FSW joining technique, in which the tool tip 24 enters the coating 14. Accordingly thickness $t_c$ is greater than d. For thicker coatings 14, this may be preferred as the part 12 to coating 14 interface may be more reliably joined in the event that parts and coating 14 are not controlled to ensure no gap is present at this interface.

Figure 4:
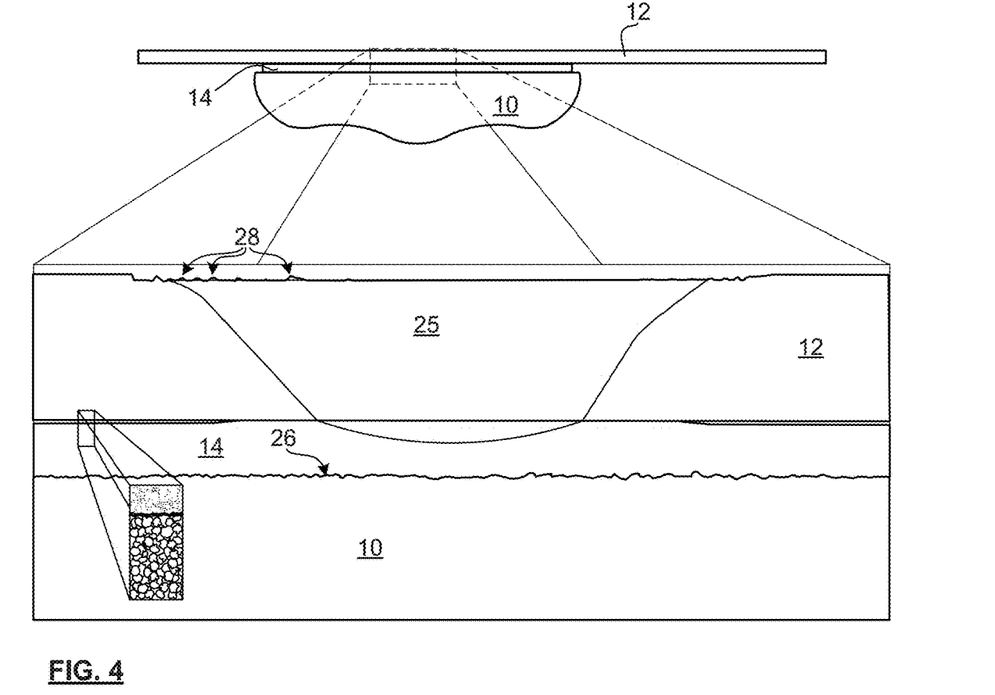
FIG. 4 is a schematic view of a resulting joined object, with an enlarged cross-section showing features that result directly from the joining technique.

FIG. 4 is a schematic illustration of some differentiating microstructural features of a join produced according to the method described above. A planar section cutting transversely to the weld line, is shown enlarged. Specifically a weld is shown consistent with the joining of a rib to a skin. The weld line might be a stitch weld or a continuous weld. It will be appreciated that two welds on opposite sides of the rib could equally have been used, or stitch welding could alternatively have been employed.

The most prominent feature is nugget 25, which features a different microstructure, and usually a finer crystal granularity than, the surrounding material of $2^{nd}$ part 12. The nugget 25 is not exactly homogeneous. There is an asymmetry of the nugget 25, associated with advancing and retreating directions of the flowing plasticized material that has frozen. The nugget 25 incorporates some of the material from coating 14, which tends to be non-uniformly mixed with the material from part 12. The unmixed components tend to be found in roughly conical sheets surrounding a centre axis of the nugget. If compatible metals are used for coating 14 and part 12, the non-uniform mixing may be apparent. There is some variability in how the nugget is shaped depending on flow properties of the materials of part 12 and coating 14, as well as process parameters such as spindle rotation rates, tool plunge depth, advance rate, etc. The interface between the nugget 25 and part 12 is not an exactly defined boundary, but it is typically of the general cross-sectional form shown in FIG. 4.

The nugget 25 is surrounded by the part 12 that is altered by heat, known as a heat affected zone, which exhibits morphology consistent with the process. There is a tapering of the heat affected zone until the part 12 is substantially unaffected, which overlies the coating 14 that appears as a distinct, and unjoined layer. It is preferable to provide an adhesive, filler, and/or sealant within this gap to increase a static strength of the join, and to increase a fatigue resistance.

A microstructure of the cold sprayed coating 14 may be among the densest of thermal sprayed coatings, but is not as dense as cast or extruded parts. A microscopic examination of the cold sprayed layer, especially away from the nugget 25 and the heat affected zone, has substantially no intermetallics formed at the interface 26 or in the nugget 25, and has the microstructure characteristic of cold sprayed coatings:

plastically deformed particles. Unlike thermal sprayed coatings that are built up of lamellae or splats with generally very flat structures, cold sprayed layers are plastically deformed powders. A second enlargement is provided in FIG. 4, schematically showing a microstructure of coating 14 that is uniquely associated with the cold spray deposition. While a shape of the particles that are accreted and deformed during accretion depend on the initial shape of the feedstock particles, they are deformed plastically by the cold spray deposition, and are substantially intact, without sign of melting and fusing.

The $2^{nd}$ part 12, opposite meeting surface 12a, bears circular tooling marks 28 left by a shoulder of the tool. A track of these marks is typically visible from a back surface of the join on the part 12. The track extends from the start to the end of the weld, the end being usually demarcated by a bore hole left on the part where the tool was removed.

As a natural product of cold spray, the coating 14-part 10 interface 26 is substantially rough. The interface between the part 10 and coating 14 will depend substantially on the process used to prepare the surface of the part 10 for the coating (which may involve shot peening, grit blasting, sanding, etching, etc. well known in the art).

The gap between the parts 10,12 away from the nugget 25 may be filled with a sealant, filler and/or adhesive, which preferably is imbibed by capillary effect, after the joining. Substantial advantages may be provided with such filling. Preferably the filling is provided with a liquid that has rheological and surface properties that allow for the capillary effect to naturally imbibe the liquid, and then to set or rigidify to preclude later loss of the fill. The filling may alternatively be provided before the joining, especially if the down force of the FSW/FASB process displaces the sealant, filler and/or adhesive.

Example 1

Figure 5A:
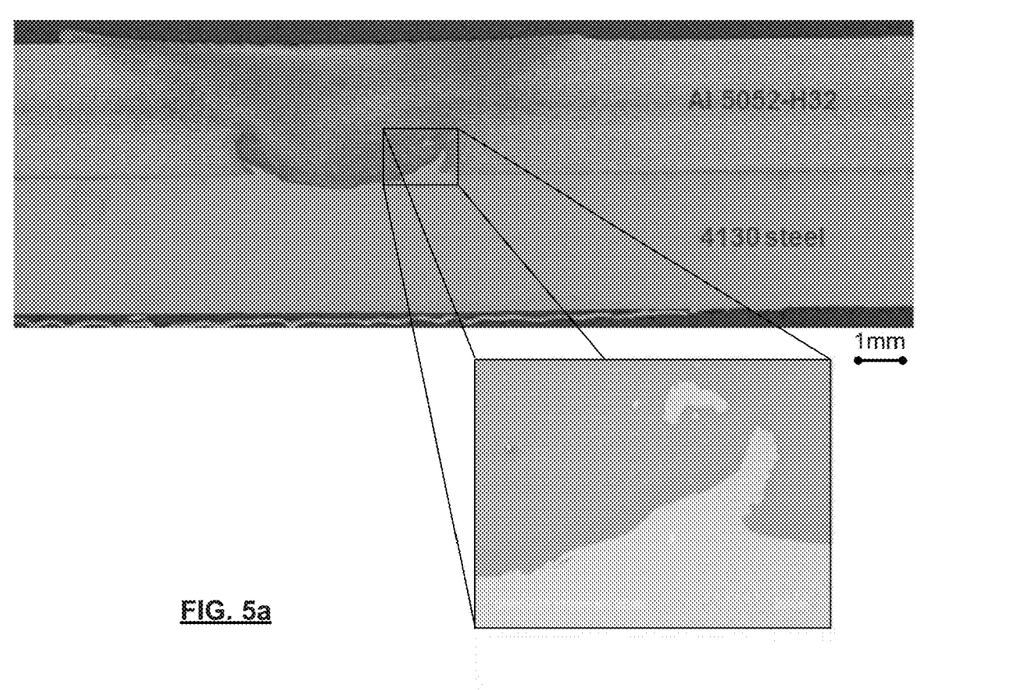
FIG. 5a is a cross-sectional image of a conventional FSW join of Al (5050-H32) onto steel (4130) with an enlarged section showing features that lead to decreased fatigue life.

FIG. 5a is a micrograph showing a cross-section of a conventional Al-steel friction stir weld. An enlargement shows steel fragments that were entrained in a plasticization during the FSW process. These particles remain frozen in the otherwise Al matrix. The join of FIG. 5a was made using a conventional FSW approach, which means that a pin tool is designed to be slightly longer than the top sheet (generally between 0.3-1.0 mm longer). As the Al sheet was 3 mm thick, the tool pin length was 3.6 mm. The tool material can be a hardened steel (H13, D2, etc. . . . ) but wear issues are encountered doing so. It is preferable to use a W-based tool material to prevent tool wear although wear issues are still possible in a production environment with this material. This specific bond was created with a tool composed of W-15/20% Co. The W-based tool consisted of a conical pin without features, such as threads, flats or flutes, because these features are harder to manufacture in this material. The FSW process parameters used were: rotational speed of 800 RPM & travel speed of 0.5 m/min in force control.

The interface created is a mix between Al—Fe intermetallics & mechanical interlocking obtained by the friction stir welding process by itself. As is known in the art, the intermetallic's length and thickness drive the bond strength.

While the steel fragments embedded in the nugget are valuable for the mechanical interlocking, these are known to be particularly liable to crack initiation. This makes conventional FSW generally inapplicable to fatigue prone applications. Galvanic corrosion also occurs because of the conductivity mismatch between the metals.

Figure 5B:
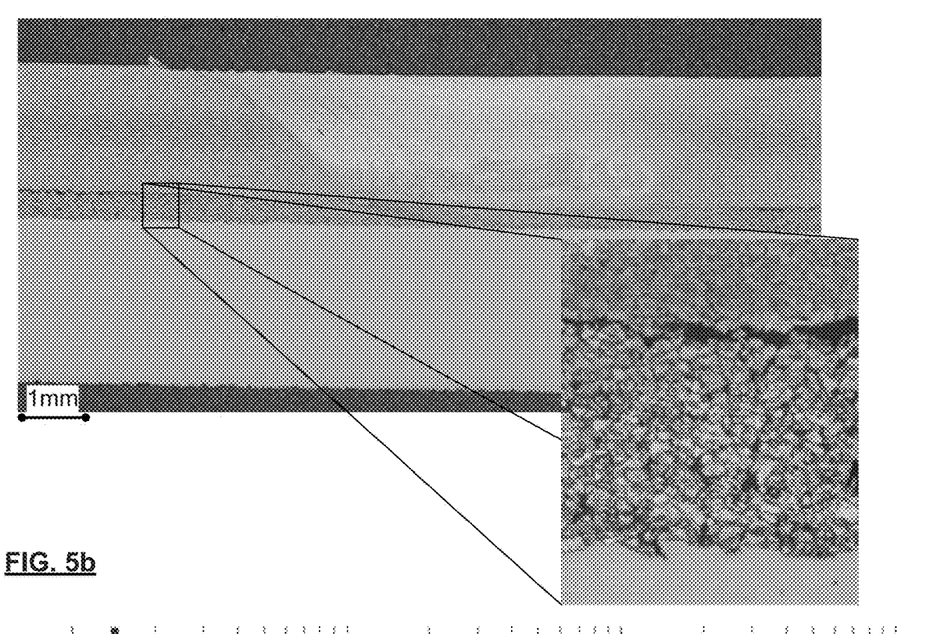
FIG. 5b is a cross-sectional image of a cold sprayed interlayer and FSDB join that has improved fatigue life.

FIG. 5b is a micrograph showing a cross-section of a friction stir weld in accordance with the present invention. The join of FIG. 5b was made using a cold sprayed layer deposited into a cold rolled steel sheet. Specifically a pure aluminum powder (AlH15) was used as a feedstock for the cold spray process. The deposit thickness was about 400 μm applied in multiple passes. The specific process parameters used were: Carrier Gas $N_2$; Gas pressure 4 MPa; Gas flow rate 2200 LPM; Gun transverse velocity 300 mm/s; Powder feed rate 20 g/min; Spray distance 40 mm; Powder gas pressure 4.2 MPa; and Powder gas flow rate 500 LPM.

An enlargement shows the cold spray microstructure referred to above, as well as the interface with the steel sheet and the gap between the Aluminum sheet above the cold sprayed layer. The alignment of the box and the enlargement is approximate.

With this coating, FSJ is now essentially an aluminum onto aluminum weld, and any aluminum-aluminum FSW pin tool could have been used (e.g. hardened steel or Ni—Co alloy) in order to join the cold sprayed layer and the top aluminum sheet. In the present case a pin was formed of hardened tool steel H13. The Al sheet bonded to the coated low carbon steel, was 2 mm thick. The FSW pin tool design was made with a slightly lower pin tool length (150 μm less) than the thickness of the Al sheet (i.e. 1.85 mm). These FSW process parameters were used: rotational speed of 1500 RPM, travel speed of 0.75 m/min in force control.

Lap shear test coupons were made in order to quantify joint strength. Width of coupons was of 25 mm using a 25 mm overlap length. The shear strength is calculated based on the aluminum substrate (base metal thickness). A 100 kN electromechanical testing machine from MIS™ was used at a test speed of 2 mm/min. The initial strength of the conventional FSW bond of FIG. 5a was appreciably better than that of FIG. 5b, as expected.

Figure 6:
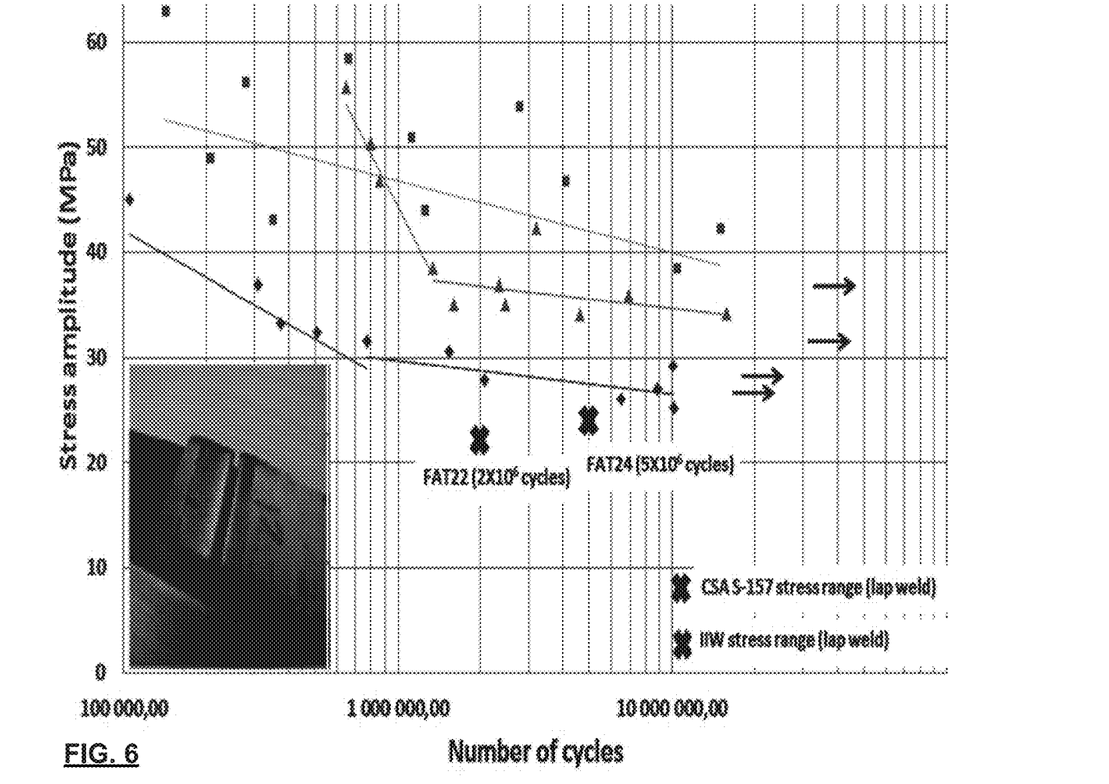
FIG. 6 is a graph showing fatigue life of a conventional FSW join as per FIG. 5a, FSW with an added cold spray as per FIG. 5b, and FSW with added cold spray and an epoxy between the joint toward the steel edge.

FIG. 6 is a graphic comparison of fatigue of samples. Samples according to FIG. 5a are reported as diamonds, and samples according to FIG. 5b are reported as triangles. As can be seen in FIG. 6, failure due to fatigue occurs in many fewer cycles, with the same stress amplitude, for conventional FSW bonds. Squares represent samples prepared in the same manner as FIG. 5b, but with an adhesive epoxy imbibed between the joint away from the nugget by capillary force alone, after the joint was formed. The epoxy was Loctite 9412™ from Loctite, and the addition of this was found to appreciably improve durability of the join. The epoxy was applied with syringes into the lap weld after the FSW joining, by drawing the syringes along the steel edge of the join, which was about 2.5 mm from the FSW seam.

Example 2

A range of thicknesses of coatings, and plunge depths tool pin depths, were examined, and it was found that a distance d greater than 250 μm was critical for an lxxx series Al cold sprayed coating, and that a distance d of 550 μm was sufficient. As will be appreciated by those of skill in the art, other minimum distances may be required for other materials, and the minimum distance d can be determined for other material systems in a like manner, using ordinary skill in the art.

Figure 7:
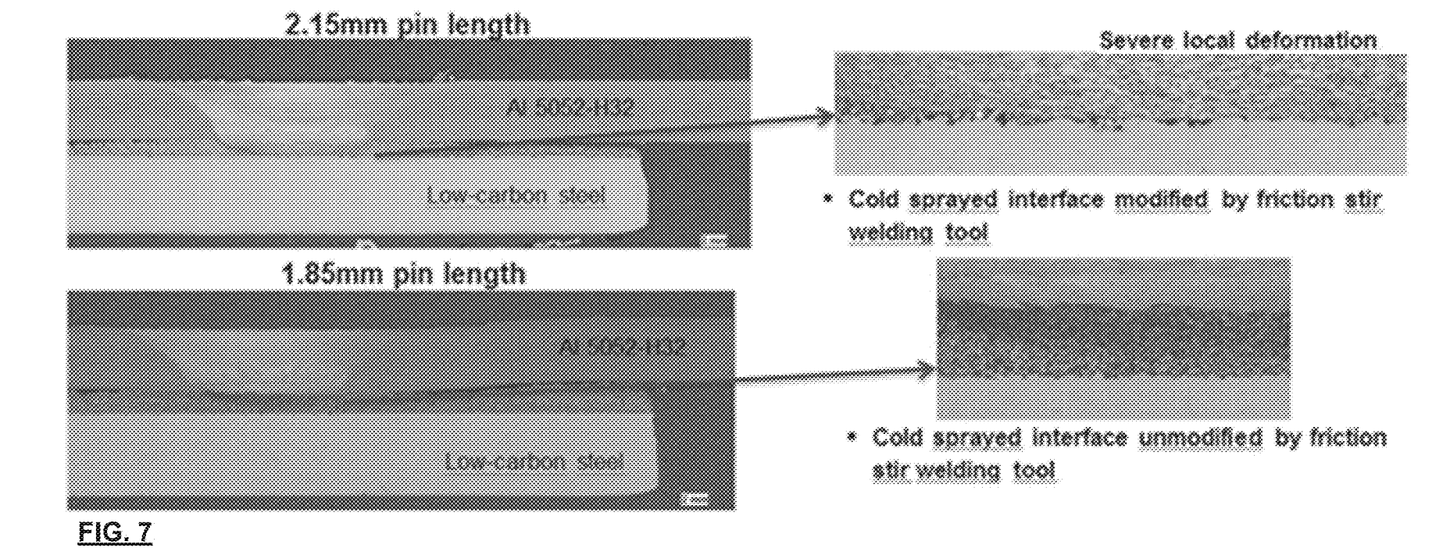
FIG. 7 is a comparison of cross-sections of FSW joining with a pin tool that came within about 250 µm of a steel plate and damaged the steel to cold spray interface, vs. a FSDB process in which the steel plate never came closer than about 550 µm from the steel plate, and was not damaged.

FIG. 7 includes micrographs of a first join and a second join, and respective enlargements, showing a join with a coating that failed during FSJ processing, in comparison with a working join. Both joins were made according to the method described in relation to FIG. 5b by cold spraying a layer deposited into a cold rolled steel sheet (low carbon steel). The only difference is that in the first join (top), the tool length was 2.15 mm, which penetrated into the cold sprayed Al coating by about 0.15 mm. The second join (bottom) was exactly as described with respect to FIG. 5b.

Using a longer pin tool, which entered into the cold sprayed layer and came to within 0.25-0.3 mm of the steel to coating interface, was detrimental to the joint strength because it modified the cold sprayed interface with the bottom steel sheet. Severe local deformation was caused by the FSJ process. The interface showed delamination of the cold sprayed layer in some places which reduces the area taking part in bonding. Visual inspection of the images shows the deformation for the first join. The deformation was so clear that the sample was not tested for fatigue. The joint was found to already be 10-15% weaker in static pull strength, and is expected to fare far worse in fatigue tests where every disbanded area becomes a center for nucleating cracks.

Figure 8A:
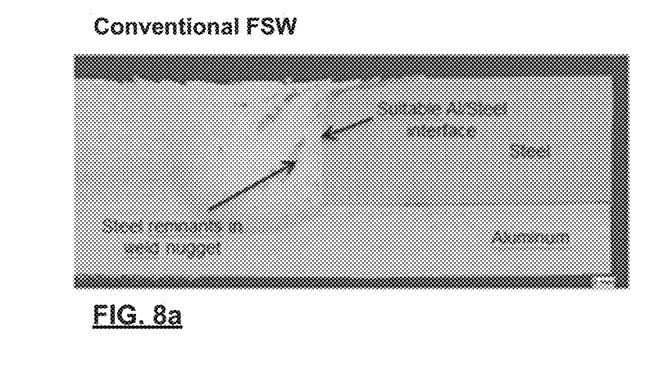
FIG. 8a is a schematic illustration of a conventional FSW butt join, with steel remnants entrained in the nugget.
Figure 8B:
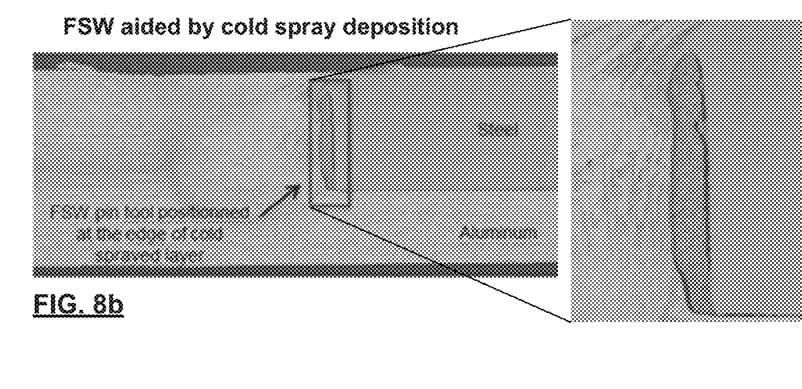
FIG. 8b is a schematic illustration of a FSW butt join with a cold spray layer that failed during FSW joining.

FIGS. 8a,b illustrate the failed attempts to butt join aluminum to steel reported hereinabove. FIG. 8a shows a conventional FSW butt join with integrated backing of a steel part onto Al. The FSW pin tool is placed entirely in the aluminum but its side just touches the steel & it featured steel remnants in the weld nugget. The FSW pin tool used was made of a Ni—Co alloy material. The steel needs to be placed at the advancing side in order to obtain a sound interface. If we position the FSW pin tool side more into the aluminum (away from the weld line), the static mechanical properties decrease.

FIG. 8b shows a butt join with a pure aluminum (AlH15) cold-sprayed layer deposited on the steel part. Deposits of 300 to 900 μm were tried on 6.35 mm steel plates. Although each test failed to produce a bonded structure after friction stir welding, deposits of 900 μm showed the best results. Evidently, due to severe plastic deformation at the aluminum-steel interface, the cold sprayed layer did not have sufficient bonding strength to accommodate the large lateral forces involved in butt welding. In comparison, a lap weld configuration (FIG. 5b) achieves better results due to the forging, or compression, loads applied into the cold sprayed layer.

Subsequent work has shown that AlH5 (5 micron instead of a 15 micron) powders can have a considerably higher adhesion, and may be preferred if the additional costs of handling and supplying a finer cold spray powder feedstock is acceptable.

A series of tests were used to determine a minimum thickness of cold sprayed aluminum (AlH5 pure aluminum powder) on steels (Usibor™ 1500 & 201LN stainless steel). It was found that the minimum thickness for which a good overall static strength is obtained, was about 185 μm. With a distance from the steel surface to the tool tip of 300 μm, a good bond was made and no severe friction stir welding modification of the steel interface was observed. Thicker cold sprayed layers (up to 900 μm), at a distance from steel of 300 μm, should obtain stronger joints with greater mixing of the cold sprayed layers with the sheet. FSW tool uses in the experiments had a 11.0 mm shoulder diameter with a 4.5 mm diameter pin. FSW process parameters used were 1300 RPM in rotational speed and 0.6 m/min in travel speed. The increase of shear strength obtained compared to previous results is explained by the change from AlH15 powder to AlH5 powder which gives a higher adhesion strength of the cold spray deposit into the steel substrate. AlH5 powder had a lower mean powder size compared to AlH15, which also improves density.

Applicant has further demonstrated bonding of Al AA6022-T43 1.35 mm thick to Usibor™ 1500 and 201LN stainless steel as stated previously. The FSW process parameters & FSW tool were the same as stated before.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A process for joining first and second metallic parts respectively having more of a first metal and second metal than any other element by weight, with the first metal being incompatible with the second metal, and the first metal having a lower propensity to cold plasticization than the second metal, the process comprising:
   providing the first part with a surface for joining to a meeting surface of the second part;
   cold spraying onto the surface a 150-900 μm thick layer of a third metal that is compatible with the second metal;
   placing the coated surface against the meeting surface; and
   lap welding the two parts by friction stir joining while keeping a friction stir tool at least 300 μm away from the first metal throughout the joining.

2. The process according to claim 1 wherein the third metal is the same as the second metal.

3. The process according to claim 1 wherein the third metal is Al or an Al-base alloy.

4. The process according to claim 1 wherein the second part contains more than 50 wt. % Al.

5. The process according to claim 1 wherein the first part has a higher hardness than the second part.

6. The process according to claim 1 wherein the cold spray layer is 185-500 μm thick.

7. The process according to claim 1 wherein throughout the joining the friction stir tool is kept a distance of less than 300 μm away from an interface between the cold sprayed layer and the second part.

8. The process according to claim 1 wherein the first part is composed of one of: a steel, an alloy of titanium, an alloy of magnesium, a strengthened copper alloy, or a composite with most of the surface composed of one of: a steel, an alloy of titanium, an alloy of magnesium, or a strengthened copper alloy.

9. A join comprising:
   a first metallic part comprising more of a first metal by weight than any other species;
   a second metallic part comprising more of a second metal by weight than any other species, the first and second metals being incompatible, and the first part having a lower propensity to cold plasticization than the second part; and
   a 150-900 μm thick layer between the first and second parts, the layer being of a metal compatible with the second part, and having a morphology and interface with the first part, consistent with cold spray deposition of the layer;
   wherein a stir zone of dynamically recrystallized material runs from a side of the second part towards the first part, the stir zone having a concentric ring formation and being consistent with friction stir joining of the second part to the first part where a friction stir tool is kept at least 300 μm away from the first metal throughout the joining.

10. The join of claim 9 wherein the stir zone and an interface between the layer and first part is substantially devoid of intermetallics.

11. The join of claim 9 wherein the morphology features an accretion of partially distinct, plastically deformed particles, away from the stir zone.

12. The join of claim 9 wherein a sealant fills a space between the first and second parts away from the stir zone.

13. The join of claim 9 wherein the second metal and compatible metal are Al.

14. The join of claim 9 wherein the second metal and compatible metal are Al or Mg, and the first metal is one of steel, Ti, Cu, or Mg.

* * * * *